United States Patent [19]

Kaminski et al.

[11] Patent Number: 5,520,866
[45] Date of Patent: May 28, 1996

[54] PROCESS FOR THE PREPARATION OF FRICTION MATERIALS CONTAINING BLENDS OF ORGANIC FIBROUS AND PARTICULATE COMPONENTS

[75] Inventors: Stanley S. Kaminski, Stamford; Robert E. Evans, Huntington, both of Conn.

[73] Assignee: Cytec Technology Corp., Wilmington, Del.

[21] Appl. No.: 419,879

[22] Filed: Apr. 11, 1995

Related U.S. Application Data

[62] Division of Ser. No. 287,736, Aug. 9, 1994.

[51] Int. Cl.⁶ .................................................. D04H 1/20
[52] U.S. Cl. ............................................ 264/112; 264/122
[58] Field of Search ...................................... 264/112, 122

[56] References Cited

U.S. PATENT DOCUMENTS

| | | |
|---|---|---|
| 2,691,645 | 10/1954 | Ham . |
| 2,963,457 | 12/1960 | Miller . |
| 2,983,718 | 5/1961 | Wishman et al. . |
| 3,325,345 | 6/1967 | Hider . |
| 4,137,214 | 1/1979 | Sochalski . |
| 4,145,223 | 3/1979 | Iwata . |
| 4,197,223 | 4/1980 | Bartram . |
| 4,274,914 | 6/1981 | Keith et al. . |
| 4,324,706 | 4/1982 | Tabe et al. . |
| 4,374,211 | 2/1983 | Gallagher et al. . |
| 4,384,640 | 5/1983 | Trainor et al. . |
| 4,387,178 | 6/1983 | Tracy et al. . |
| 4,418,115 | 11/1983 | Le Lannou . |
| 4,432,922 | 2/1984 | Kaufman et al. ................. 264/119 |
| 4,485,138 | 11/1984 | Yamamoto et al. . |
| 4,487,729 | 12/1984 | Kaufman ........................... 264/26 |
| 4,495,030 | 1/1985 | Giglia . |
| 4,508,855 | 4/1985 | Peters . |
| 4,539,240 | 9/1985 | Wargin . |
| 4,656,203 | 4/1987 | Parker . |
| 4,748,075 | 5/1988 | Beyer et al. . |
| 4,769,274 | 9/1988 | Tellvik et al. . |
| 4,811,908 | 3/1989 | Galati . |
| 4,866,107 | 9/1989 | Doxsee et al. .................... 523/153 |
| 4,968,468 | 11/1990 | Leinweber ......................... 264/113 |
| 5,004,497 | 4/1991 | Shibata et al. . |
| 5,106,887 | 4/1992 | Horiguchi ......................... 523/155 |
| 5,190,657 | 3/1993 | Heagle et al. . |
| 5,272,198 | 12/1993 | Kaminski et al. . |
| 5,395,573 | 3/1995 | Taguchi ............................. 264/120 |

FOREIGN PATENT DOCUMENTS

| | | |
|---|---|---|
| 0282004 | 3/1988 | European Pat. Off. . |
| 1093990 | 1/1959 | Germany . |
| 62-89784 | 4/1987 | Japan . |
| 62-106133 | 5/1987 | Japan . |
| 62-149908 | 7/1987 | Japan . |
| 866445 | 1/1959 | United Kingdom . |
| 1604827 | 8/1977 | United Kingdom . |
| 2027724 | 7/1979 | United Kingdom . |
| 2129006 | 10/1983 | United Kingdom . |
| 93/04300 | 8/1992 | WIPO . |

Primary Examiner—Allan R. Kuhns
Assistant Examiner—Kenneth M. Jones
Attorney, Agent, or Firm—Frank M. Van Riet

[57] ABSTRACT

Dry processed friction materials are disclosed wherein the components thereof include dry blends of a) fibrillated, organic, synthetic polymer, b) organic, synthetic polymer staple and c) organic, synthetic soluble polymer particles.

15 Claims, No Drawings

PROCESS FOR THE PREPARATION OF FRICTION MATERIALS CONTAINING BLENDS OF ORGANIC FIBROUS AND PARTICULATE COMPONENTS

This is a divisional of co-pending application Ser. No. 08/287,736, filed on Aug. 9, 1994.

BACKGROUND OF THE INVENTION

This invention relates to a dry blend of a) fibrillated, organic, synthetic polymer, b) synthetic, organic polymer fiber staple and c) synthetic, organic, soluble polymer particles and its incorporation into non-asbestos type friction materials for the purpose of improving their preformability and in many cases, improving the physical properties of the resultant cured friction material. Preforms are compressed components of a friction material. The preforms, in the general shape of the resultant cured friction material, are formed under pressure at ambient temperature and subsequently transferred into a hot mold for final cure under heat and pressure. Many friction formulations require the use of a preforming aid to enable the preforms to achieve sufficient integrity to allow the transfer of the preform to the hot mold. The preforms serve as intermediate products in the manufacture of friction elements such as brake linings, disk pads, truck blocks, off highway brakes, clutch facings and the like.

As is well recognized, it has become incumbent upon the industry to find a cost-effective replacement for asbestos in friction materials because of the health, environmental and safety hazards attributed to asbestos. Numerous approaches to the replacement of asbestos have led to a substantial body of technology and prior art that has resulted in at least two major categories of non-asbestos formulations. They are: 1) semi-metallic materials, and 2) organic non-asbestos materials. These materials are more fully discussed in U.S. Pat. No. 4,866,107, hereby incorporated herein by reference.

The elimination of asbestos from friction material formulations, although relatively successful, has caused, however, various other problems not the least of which is difficulty in preforming and processing blends of ingredients for the manufacture of preforms, the reduced strength and toughness of preforms produced from other ingredients, the increased cost of said ingredients vis-a-vis asbestos and the physical and frictional performance of said finished products compared to asbestos-containing materials. Additionally, many of the asbestos replacement type formulations for friction materials have failed to achieve success due to reduced frictional/thermal stability properties of the molded friction material which render them less competitive.

Most attempts to eliminate asbestos fibers from friction material formulations have centered around the use of other organic and inorganic fibrous materials, alone or in conjunction with a myriad of different components.

For example, U.S. Pat. No. 4,145,223 incorporates glass fibers and ceramic fibers whereas U.K. Published Application No. 2027724A employs preoxidized acrylic fibers. Similarly, U.S. Pat. No. 4,197,223 and U.K. Patent No. 1604827 teach mixtures of inorganic and organic fibers such as glass fibers, mineral wools, alumino-silicate fibers, wood pulp, jute, sisal and cotton linters. Aramid fibers are taught in U.S. Pat. Nos. 4,374,211 and 4,384,640 and acrylic fibers are shown in U.S. Pat. Nos. 4,418,115; 4,508,855; 4,539,240 and 4,656,203; G.B. Published Application No. 2,129,006A and Japanese Published Application Nos. 87/106,133; 87/89, 784 and 87/149,908.

Additionally, in U.S. Pat. No. 4,324,706 there is disclosed the combination of pulp-like particles of heat-resistant aromatic polymeric materials, inorganic or organic fibrous materials, friction-regulating agents and thermosetting polymer binders.

U.S. Pat. No. 4,866,107 claims a composition of a thermosetting binder resin, a fibrous reinforcing material and a fibrillated acrylonitrile polymer-based fiber of an Efficiency Index from about 0.8 to about 2.0.

European Published Patent Application No. 0,282,004 discloses a reinforcing mixture for friction products employing a polyacrylonitrile wet gel containing an additive comprising polyethylene glycol esters of pelargonic acid, enanthic acid, caprylic acid, capric acid and blends thereof etc.

Recently issued U.S. Pat. No. 5,106,887 teaches the formation of non-asbestos friction materials comprising fibrillated acrylic fibers admixed with glass fibers, heat resistant organic fibers, inorganic fibers or metallic fibers wherein the fibrillated acrylic fibers have a CANADIAN STANDARD FREENESS (CSF) of at least 450 ml whereas U.S. Pat. No. 5,004,497 claims a friction material comprising 0.85–30%, by weight, of carbon fibers and 2–20%, by weight, of aramid fibrillated and chopped fibers. The material may contain 3–20%, by weight, of polyimide dust, melamine dust, cashew dust or phenol dust. These dusts are cured thermosetting resins, and as such, are not soluble and therefore do not fall within the scope of the present invention. The '887 patent does not mention the inclusion of organic, synthetic polymer particles and, in fact, specifically discloses that the organic fibers are aramid pulp, a fibrillater fiber. No organic, synthetic polymer particles are mentioned.

Moreover, PCT Published Application No. WO93/04300 teaches the production of a composite friction material comprising a matrix resin, a fiber reinforcing material and aramid particles. The fibrous reinforcing material may be pulp or floc, but not both.

All of the above cited references fail to recognize the unique cooperative effect which is achieved by employing the unique dry blend of the present invention. The references either fail to teach the use of particles of synthetic, soluble organic polymer or, if such particles are suggested, fail to include one or both of the other critical components of the present invention. More specifically, U.S. Pat. No. 4,324,706 teaches pulp-like particles such as fibers, films, flakes or ribbons each provided with a plurality of tentacle-like projections in combination with staple fibers. No polymer particles having diameters of less than 60 microns are disclosed in the '706 patent, the particles of this reference being more akin to fibrillater fiber component a) hereof than the particles c).

U.S. Pat. No. 4,866,107 teaches a blend of a fibrillated fiber and other organic, synthetic polymer fibers but does not mention that said other fibers are staple or that particles of organic, synthetic polymer must be employed therewith.

The WO93/04300 published application is probably the closest prior art as relates to the instant invention. The '300 application utilizes aramid particles as wear additives in the formation of friction materials in conjunction with fibers in the form of floc or pulp. The floc is described as fibers cut to lengths of 1–10 mm whereas the pulp is described as fibrillated fibers. Both the pulp or floc are preferably composed of aramid-type polymers. The aramid particles range from 10–250 microns in size, the smallest being described as providing processing assistance by aiding the opening of the fibrillated fiber during mixing but the application does not discuss preforming benefits. The friction materials of this invention differ from those taught by the '300 application in that herein there is employed both a fibrillated fiber and a fiber staple in conjunction with the soluble, organic, synthetic polymer particles. This combination of ingredients has been found to provide unexpectedly superior results with respect to performance and in many cases, superior physical, frictional/thermal properties as shown below.

Related patents which show blends of fibrous materials and polymer particles include U.S. Pat. No. 3,325,345 which is limited to fibrillated cellulosic fibers; U.S. Pat. No. 4,387,178 which requires the presence of a polyacrylic latex; U.S. Pat. No. 4,485,138 which requires the presence of rubber to prepare a vulcanized blend of fibers; U.S. Pat. No. 4,495,030 which includes submicron size glass fiber in a toxic vapor absorptive filter material; U.S. Pat. No. 4,748,075 which teaches a soft gasketing material composed of at least three (3) different fibers, natural fibers, synthetic organic fibers and mineral or metal fibers. No organic, synthetic, soluble polymer particles are added thereto.

U.S. Pat. No. 4,769,274 teaches the production of inexpensive mats using a coarse, cellulosic fiber, thermoplastic synthetic polymer fibrils and non-fibrous, thermoplastic, synthetic polymer particles. The products are used as door panels, interior/exterior partitions, molded doors, etc., when laminated with other disclosed ingredients. No disclosure of friction materials is made.

U.S. Pat. No. 5,190,657 is related to blood filters comprised of specific denier interlocked, textile fibers and certain fibrillated particles of polymeric material as taught in U.S. Pat. No. 4,274,914. The particles are described as not being fibers.

U.S. Pat. No. 5,272,198, by the present inventors, relates to a reinforced material comprised of an elastomeric matrix and a small denier acrylic fiber which may be used in conjunction with other fibers such as glass fibers, polyolefin fibers, polyamide fibers, polyester fibers, polyimide fibers etc. No particles of synthetic, soluble, organic polymer are added.

SUMMARY OF THE INVENTION

The present invention relates to a dry processed friction material comprising from about 1 to about 30 weight percent of a dry blend comprising:
  a) from about 25 to about 90 weight percent of a fibrillated, synthetic, organic polymer fiber;
  b) from about 5 to about 20 weight percent of a synthetic, organic polymer staple fiber; and
  c) from about 5 to about 70 weight percent of synthetic, soluble organic polymer particles.

More particularly, the present invention relates to a friction material comprising from about 1 to about 30 weight percent of a dry blend comprising:
  a) from about 25 to about 90 weight percent of a fibrillated, synthetic, organic polymer fiber;
  b) from about 5 to about 20 weight percent of a synthetic, organic polymer staple fiber and
  c) from about 5 to about 70 weight percent of synthetic, soluble, organic polymer particles,
wherein at least one of a), b) and c) is an acrylic polymer.

When at least one of a), b), and c) is a high molecular weight acrylic or a preoxidized polymer acrylic there is provided improved physical/thermal properties in the finished friction mix.

A method for the production of a non-asbestos friction material also forms part of this invention wherein a mixture containing a powdered thermosetting resin and either of the above dry blends is prepared and the mixture is compressed to form a preform. The method whereby said preform is cured at an elevated temperature and a friction material is formed therefrom is additionally a part of this invention.

DESCRIPTION OF THE INVENTION INCLUDING PREFERRED EMBODIMENTS

It has been found that the production of non-asbestos type friction material preforms can be materially enhanced by use of the dry fiber/particle blends of the present invention. Particularly, the staple fibers and particles, which when used individually are generally not preform and processing aids, significantly contribute to the preformability of dry non-asbestos friction mixes when used together in combination with a fibrillated fiber or fibers. The performance of these synergistic blends as preforming aids is unexpectedly superior to fibrillated fiber alone, on an equal pulp content basis, and in many instances, the dry blends are more effective preform aids than fibrillated fiber alone on an equal weight basis.

Furthermore, the dry fibrillated fiber/staple fiber/particle blends are capable of being tailored to exact performance requirements especially at lower production cost. The blends impart strength and stiffness to the preforms produced therefrom enabling preform transfer to hot molds without deleteriously damaging them for curing into brake shoes, pads etc. as well as providing improved physical properties and friction/thermal stability as compared to like amounts of the fibrillated fiber alone.

The fibrillated fibers which form the first component of the dry blends of the instant invention are well known to those skilled in the art and any fibrillated fiber known to be useful in friction materials is useful herein. Specifically, and most preferably, fibrillated acrylic polymer fibers may be employed. These fibrillated fibers preferably have a Canadian Standard Freeness of below about 600 ml and have been preferably formed from a polymer whose melting point is above about 450° F. They should have a length ranging from about 2 mm to about 10 mm and a diameter of from about 8 microns to about 50 microns.

Preferred fibers are fibers of polymers having an acrylonitrile content of at least 85% (based on weight of acrylonitrile monomer content to total monomer content of the pre-polymerization mixture). Particularly useful fibers are those of polymers having an acrylonitrile content in excess of about 89%. The preferred comonomers comprise methyl methacrylate or vinyl acetate which are preferably present at levels of approximately 8.5%, by weight, as discussed above.

An even more preferred fibrillated fiber is that produced from a random bicomponent fiber made from a 50/50 mixture of a 90/10 acrylonitrile/methyl methacrylate or vinyl acetate copolymer and a 93/7 acrylonitrile/methyl methacrylate or vinyl acetate copolymer. Other comonomers may be used without limitation provided that their inclusion does not materially detract from the ability of the fiber to be fibrillated nor with the properties of the fibrillated fiber produced. Compatibility of such other monomers can easily be determined by one skilled in the art by simple experimentation. Alternatively, the acrylic fiber can be homopolymer.

Canadian Standard Freeness is measured as is described in a test set forth in an article entitled "Freeness of Pulp";

Tentative Standard 1943; Official Standard 1946; Revised 1958 and Official Test method 1985; Prepared by The Technical Committee of the Tappi Association.

The fibrillated acrylonitrile fibers useful in the instant invention can be made in any known manner such as by using a modified commercial blender. In general, modified Waring brand commercial blenders wherein the as-supplied blade has been modified to provide a break edge of about 0.25 mm on the working edge, may be used. In operation, a relatively dilute slurry of precursor fiber in water is generally introduced into the blender device which is then run for from at least about one-half hour to at least about one hour depending upon the molecular weight and diameter of the fiber being used. The fibrillated fibers are well known to those skilled in the an and can be prepared as is known to them such as described in the patents mentioned above, e.g. U.S. Pat. No. 4,866,107. Additionally, U.S. Pat. No. 4,811,908 teaches such a method, said patents hereby being incorporated herein by reference.

Fibrillated high modulus/high molecular weight acrylic fiber may also be used. By "high molecular weight" is meant a weight average molecular weight of at least about 150,000. The fibrillated fibers useful herein may also contain additives such as cyanoguanidine (DICY), metal salts, N-substituted malimides, etc. to enhance thermal stability.

The fibrillated fibers may also be formed from other polymers and still be useful in the present invention. Thus, aliphatic polyamides, polyesters, polyvinyl alcohols, polyolefins, polyvinyl chlorides, polyvinylidene chlorides, polyurethanes, polyfluorocarbons, phenolics, polybenzimidazoles, polyphenylenetriazoles, polyphenylene sulfides, polyoxadiazoles, polyimides, aromatic polyamides etc. may be used. The aromatic polyamides (aramids) are the second-most preferred after the acrylic polymers discussed above, followed by the cellulose acetates, polybenzoxadiazoles, polybenzimidazoles, etc. Aramid polymers such as poly (p-phenylene terphthalamide) and poly (m-phenylene isophthalamide) are exemplary.

Aramids, as used herein, are intended to include wholly aromatic polycarbonamide polymers and copolymers of recurring units of the formula

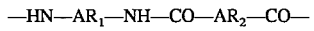

—HN—AR$_1$—NH—CO—AR$_2$—CO— wherein AR$_1$ and AR$_2$, which may be the same or different, represent divalent aromatic groups. Para-aramids refer to para-oriented aromatic polycarbonamides of Formula I, above, wherein AR$_1$ and AR$_2$, which may be the same or different, represent divalent, para-oriented, aromatic groups. By "para-oriented" is meant that the chain extending bonds from aromatic groups are either coaxial or parallel and oppositely directed, for example, substituted or unsubstituted aromatic groups including 1,4-phenylene, 4,4'-biphenylene, 2,6-naphthalene, and 1,5-naphthalene. Substituents on the aromatic groups other than those which are part of the chain extending moieties should be nonreactive and must not adversely affect the characteristics of the polymer for use in the practice of this invention. Examples of suitable substituents are chloro, lower alkyl and methoxy groups. The term para-aramid also encompasses para-aramid copolymers of two or more para-oriented comonomers including minor amounts of comonomers where the acid and amine functions coexist on the same aromatic species, for example, copolymers produced from reactants such as 4-aminobenzoyl chloride hydrochloride, 6-amino-2-naphthoyl chloride hydrochloride, and the like. In addition, para-aramid encompasses copolymers containing minor amounts of comonomers containing aromatic groups which are not para-oriented, such as, for example, m-phenylene and 3,4'-biphenylene. Those taught in WO93/04300, incorporated herein by reference, are exemplary.

The fibrillater fiber components of the blends of the present invention may be crimped or non-crimped.

Preferably the fibrillated acrylic fiber should have a BET surface area of over 5M$^2$/g, a CSF from 50 to 600, a modulus of 2.75 GPa to 16.5 GPa, a number average molecular weight of 75,000 to 500,000 and a specific gravity of 1.1 to 1.2.

The second critical component of the dry blends useful in the instant invention is a synthetic, organic polymer, staple fiber. Any of the polymers discussed above with respect to the fibrillated fiber component can be utilized to produce the polymer forming the staple fiber component. The preferred staple fiber is one made from an acrylic polymer i.e. acrylonitrile polymer, as discussed above. The staple fiber may also be crimped or non-crimped. It preferably has a length of from about 0.5 mm to about 12 mm, more preferably from about 1.5 mm to about 7 mm. It preferably has a diameter of from about 8 microns to about 50 microns, more preferably about 10 to about 25 microns, a modulus of 2.75 GPa to 85 GPa and a specific gravity of 0.90 to 2.00.

Preferably, the staple fiber is an acrylic staple with a minimum modulus of 2.75 GPa and a minimum weight average molecular weight of 75,000 and a specific gravity of 1.15 to 1.2. The acrylic staple fibers may be either prepared from copolymers or homopolymers as discussed above.

Preferably, the staple fiber for higher temperature and/or structural performance is an acrylic staple fiber having 1) additives to increase thermal stability or 2) high modulus/high molecular weight with a minimum modulus of 5.5 GPa and a minimum weight average molecular weight of 150,000, or 3) been preoxidized to a greater than 30% reduction in its nitrile group content to result in a minimum modulus of 5.5 GPa because of thermal treatment or 4) any combination of 1)–3). These preferred acrylic staple fibers provide improved frictional/thermal stability and/or strength to the friction material produced therefrom.

The fiber staple may have a circular or non-circular cross-section, i.e. may be ribbon fiber, or may be dog bone shaped, S-shaped, C-shaped etc. The staple fiber may be milled, may be in the form of floc, may contain thermal stability enhancing additives, may be slightly to fully preoxidized, may be carbon fiber, or the like.

The third component of the dry blends of the present invention is a particulate, synthetic, soluble, organic polymer. The particulate component may also be produced from many of the above-discussed polymers from which the fibrillated fiber component is prepared as long as it is soluble. By the term "soluble", as used herein, is meant that the polymer from which the particles are made is soluble in some medium i.e. organic solvent, water, acid etc. and the particle maintains its physical identity after being cured into the ultimate friction device. The particulate may be formed by reaction or by grinding and/or pulverizing larger pieces of polymer.

Again, preferably, the particulate component is produced from an acrylic polymer. The particulate component may be solid or porous and may have an average diameter below about 60 microns. More preferably, the particulate is formed during the polymerization of acrylonitrile by a bulk, emulsion, aqueous-suspension or slurry process which causes a polymer particulate to be precipitated or suspended from drops of monomer or dissolved monomer as discussed in U.S. Pat. No. 2,983,718, German Patent 1,093,990, Brit.

Patent 866,445, U.S. Pat. No. 2,691,645 and U.S. Pat. No. 2,963,457. The particulate components preferably have a BET surface area of at least about 1 m$^2$/g and a specific gravity of from about 1.10 to about 1.20. For higher temperature stability, preferably the particulate acrylic component is preoxidized to a greater than 30% reduction in nitrile group content and to increase its specific gravity to about 1.25 to 1.38.

The friction material preform aid dry blend of the present invention comprises from about 25 to about 90 weight percent of the fibrillated fiber, preferably from about 35 to about 90 weight percent; from about 5 to about 20 weight percent of the staple fiber, preferably from about 5 to about 15 weight percent and from about 5 to about 70 weight percent of the particulate soluble polymer, preferably from about 5 to about 60 weight percent, the total weight percent of all three components, of course, being 100%.

Preferably at least one of the three components of the blend is an acrylic polymer. More preferably, two components are acrylic polymers and most preferably, every component is an acrylic polymer.

When at least either the staple fiber or the particulate component is an acrylic polymer, the particulate component can be carbonized, but it is preferred that the particulate polymer be non-carbonized.

Two general types of non-asbestos type friction materials compounded as mixes of dry ingredients have evolved in the art. They are semi-metallic materials and organic non-asbestos materials. Each type can be effectively modified with the blends discussed above in accordance with the present invention, as discussed above.

Semi-metallic systems typically include powdered phenolic resins; carbonaceous particles, such as graphite or carbon particles; non-asbestos fibers; inorganics such as magnesium oxide, zircon, mullite and alumina; metals, such as those of iron, copper, brass and stainless steel in the form of powders, shavings, fibers etc.; and other modifiers, such as elastomers and inorganic wear fillers.

Semi-metallic systems typically may contain the following amounts of the following constituents:

| Ingredient | Wt. % |
| --- | --- |
| Phenolic Resin | 4–13 |
| Graphite or Carbon Particles | 14–15 |
| Fibers[1] | 0–25 |
| Ceramic Powders[2] | 2–10 |
| Metal Powders[3] | 14–15 |
| Other Modifiers[4] | 0–20 |

[1]steel, ceramic or carbon fibers
[2]magnesium oxide, zircon, mullite, alumina
[3]iron, copper, brass, stainless steel
[4]elastomers, inorganic fibers In the manufacture of friction elements by the dry blending technique, the semi-metallic friction material constituents are mixed together to form a homogenous mixture. The mixture is then usually pressed into a preform. The preform is then transferred to a second press where pressure and heat are simultaneously applied, causing the resin to melt and flow throughout the piece forming a continuous matrix for holding the other ingredients. The lining pad is then transferred to curing ovens and cured at temperatures ranging from 300° to 600° F. to further set the resins.

Organic non-asbestos systems typically include a powdered thermosetting resin; cashew particles; non-asbestos fibers; and more than 20%, by weight, of a powdered inorganic compound having a Mohs' hardness rating of greater than 2, less than 5, and capable of being subjected to temperatures of greater than about 425° C. without substantial chemical or physical alteration. Such components are described in greater detail in U.S. Pat. No. 4,137,214 which patent is hereby incorporated by reference herein for the purpose of such additional description. Organic non-asbestos systems typically may contain the following amount of the above ingredients:

| Ingredient | Wt. % |
| --- | --- |
| Thermosetting Resin | 10–30 |
| Cashew Nut Particles | 5–25 |
| Non-Asbestos Fibers | 5–15 |
| Inorganic Compound | 20–60 |

Another so-called organic non-asbestos friction material is disclosed in U.S. Pat. No. 4,278,584. This patent discloses the following general formulation:

| Ingredient | Wt. % |
| --- | --- |
| Phenol-formaldehyde Resin | 6–12 |
| Carbon Fibers | 10–40 |
| Steel Fibers | 30–60 |
| Inorganic and/or Organic Fibers | 10–20 |

Friction elements may typically be manufactured from dry organic non-asbestos mixtures by placing a quantity of the mixture in a mold and compressing the mixture to form a preform and then curing the preform under heat and pressure. The edges of the cured preform are then trimmed to remove excess material and the preform post-baked while under constraint in a forming container to prevent swelling.

The friction materials of the present invention comprise, in addition to the above-described dry blend, a thermosetting or thermoplastic matrix resin which serves as a carrier for the other components thereof, depending upon the intended use and desired result. The thermosetting (or thermoset) materials are those which exhibit no melting temperature and which yield high char residues. Where the intended uses are for a high temperature, high stress nature, the matrix resin usually is a thermosetting material, since such decompose rather than melt at high temperature. When the matrix material melts or flows, strength is difficult to maintain. Suitable thermosetting materials include phenolic resins, aromatic polyamides, polybenzoxadiazoles, polyimides, polybenzimidazoles, melamine resins, urea resins, epoxy resins and the like.

Thermoplastic matrices are those which tend to melt and resolidify at certain temperatures and under particular conditions. They are generally used in gasketing and low temperature, low friction applications. Useful thermoplastic materials include polyamides such as nylon, polyesters, acrylics, fluoropolymers and the like.

The matrix resin constitutes from about 10 to about 40% of the friction materials of the present invention with the remaining amounts being well known friction components including such other components such as fillers e.g. as to promote friction, such as iron grit, fused silica, sand; friction modifiers such as graphite, partially cured cashew-resin solids, lead, lead sulfide; friction regulators such as alumina, silica, diatomaceous earth, chalk, talcum, kaolin, mica, talc etc. These fillers are generally employed as solids having average diameter of 300 microns and less.

The individual blend components of the instant invention may be effectively introduced into the friction material separately, however, it is preferred that all the components be preblended prior to introduction into the preform mixer or preblended in the mixer prior to the introduction of other components. During mixing, the fibrillated fibers, via their tentacle-like projections, catch the staple fibers and particulate polymer so as to evenly distribute them and prevent excessive bulk. The components of the instant invention can be premixed, either in a wet or dry state, using techniques known to those skilled in the art. For example, each component can be mixed as a wet slurry in a hydropulper, a beater, a disc refiner or other types of equipment known to those skilled in the art and then dewatered on a paper machine or belt press to about 30–60% solids. Suitable cationic and/or anionic retention aids may be used to retain particulate polymer and fiber staple in the fibrillated fiber. Additionally, the particulate polymer and/or staple fiber can be blended with the wet fibrillated fiber, which is at a 30–60% solids content, during drying and fluffing in equipment such as a Rennelburg rotary dryer. All or some components may also be blended in a dry or partially dry state using a Littleford mixer, a Wrassmann processor, rotary dryer, Fitzmill, or other similar mixing equipment known to those skilled in the art. As mentioned above, the fibrillated fiber-fiber staple-particulate polymer blend may constitute from about 1 to about 30 weight percent, of the friction material, preferably from about 5 to about 25 weight percent.

The following examples are set forth for the purpose of illustration only and are not to be construed as limitations on the present invention except as set forth in the appended claims. All parts are by weight unless otherwise specified.

EXAMPLE A

Thirty pounds of a non-asbestos organic (NAO) friction formulation is prepared using the components set forth in Table 1. The formulation is mixed in a Littleford Model FM-130-D Mixer. All components except fiberglass are premixed for ten minutes. The fiberglass is then added and the formulation was mixed for another one minute. Star/bar choppers and Becker plows are used in the Littleford Mixer. The resultant product is identified as Brake Mix A.

EXAMPLE 1

(Comparative)

100 parts of Brake Mix A are added to a commercial Waring blender and mixed for one minute at 40% power on the low speed setting. The formulation was then pressed into preforms using the following steps:

A 150 gm sample of mix is evenly spread in a FMSI 728A disc pad preform mold. If difficulty filling the mold because of excessive mix bulkiness is encountered, this mix attribute is noted. A pressure of 2,500 psi is applied and held for five (5) seconds. The resulting preform is removed from the mold and visually examined for any soft edges, breakage or nonuniformity. Seven (7) preforms are prepared. Comments on appearance are set forth in Table 2.

The preforms are allowed to stabilize at ambient temperature and humidity (23° C.–50% RH) for 24 hours before testing. The height of the preforms and the recovery are then measured at the end of this time. Results are set forth in Table 2.

A 3-point flexural strength measurement is performed on preforms using an INSTRON Model 1125 resting machine at a cross-head speed of 0.1 inch/minute. Test span is four inches.

The breaking load (pounds) is recorded directly from chart recorder. Using a line tangent to the curve, the inches of pad deflection is calculated from zero to two pounds and divided by the deflection to calculate stiffness in pounds/inch.

The averages for breaking load and stiffness and 90% confidence level are calculated and the results are set forth in Table 2.

A measured performance index, MPI, which is defined as:

$$MPI=(\text{Average Strength} \times \text{Average Stiffness})^{1/2}$$

is calculated and the results are set forth in Table 2.

For comparative purposes, a predicted performance index is calculated. This index is the value expected if only the fibrillated fiber portion of the blend is used. Performance over and above this predicted factor shows the staple fiber and powder contributions to preforming.

TABLE 1

| INGREDIENT | PARTS BY WEIGHT |
| --- | --- |
| PHENOLIC POWDER HRJ 652 | 16.6 |
| BARYTES 22 | 39.6 |
| 4079 COKE | 9.4 |
| NC108 CASHEW PARTICLE | 5.0 |
| VERMICULITE #7 | 15.6 |
| VIRGINIA KYANITE | 0.7 |
| FIBERGLASS, 1/8" 178A-BA | 4.9 |
| LAPINUS ROCKWOOL L5164 | 6.7 |
| HYCAR 1411 RUBBER | 1.5 |
| TOTAL: | 100.0 |

In the following examples, the following are designations of the specifics of various blend components as used therein:

FIBRILLATED FIBER/PULP DESCRIPTIONS

| Fibrillated Fiber Designation | Commercial Designation | CSF | Surface Area $M^2/g$ | Average Fiber Length, In. | Maximum Fiber Length, In. | Efficiency Index |
| --- | --- | --- | --- | --- | --- | --- |
| A | CFF V110-1 | 250 | 50 | .25 | .30 | 1.10 |
| B | (110-1) | 180 | 50 | .25 | .30 | 1.52 |
| C | (110-1) | 430 | 50 | .28 | .32 | 0.70 |
| D | acrylic | 600 | 10 | .22 | .28 | 0.41 |
| E | acrylic | 425 | 10 | .20 | .36 | .63 |
| F | polypropylene | — | — | .28 | .31 | — |
| G | cellulose acetate | — | — | .26 | .40 | — |

STAPLE DESCRIPTIONS

| Staple Designation | Chemical Description | Denier, g/9000m | Diameter. Microns | Length (in.) | Modulus MSI | Crimp | Tenacity g/den |
|---|---|---|---|---|---|---|---|
| A | Acrylic | 1.1 | 13 | .25 | 0.75 | Yes | 3.0 |
| B | Acrylic | 0.8 | 10 | .25 | 0.5 | Yes | 2.5 |
| C | Acrylic | 0.8 | 10 | .50 | 0.5 | Yes | 2.5 |
| D | Acrylic | 5.4 | 23 | .25 | 0.8 | Yes | 3.0 |
| E | Acrylic | 3.0 | 18 | .25 | 0.5 | No | 2.5 |
| F | Acrylic | 16.0 | 40 | .25 | 0.5 | Yes | 2.0 |
| G | Acrylic | 5 | 22 | .25 | 0.5 | No | 2.5 |
| H | Acrylic | 1.5 | 13 | .25 | 2.0 | No | 5.0 |
| I | Pre-ox | 1.5 | 12.5 | .25 | 1.1 | No | 2.6 |
| J | Pre-ox | 1.5 | 12.5 | .125 | 1.3 | No | 2.6 |
| K | Aramid | 1.5 | 12 | .25 | 8 | No | 15–30 |
| L | Novoloid | 2 | 15 | .25 | 0.5 | No | 1.0 |
| M | Cellulose | N.A. | 30–40 | .16 | 0.8 | No | 5.0 |
| N | Cotton | N.A. | 25 | .10 | 0.8 | No | 5.0 |
| O | Acrylic | 0.8 | 10 | .04 | .5 | Yes | 2.5 |
| P | Acrylic | 1.1 | 13 | .02–.10 | .75 | Yes | 3.0 |
| Q | Acrylic | 5 | — | 0.2–.10 | .5 | No | 2.5 |

POWDER DESCRIPTIONS

| Powder Designation | Polymer Type | Average Particle Diameter, Micron | Surface Area $M^2/g$ |
|---|---|---|---|
| A | acrylic | 50 | 8 |
| B | acrylic | 20 | 12 |
| C | acrylic | 30 | 9 |
| D | partially oxidized acrylic | 20 | 10–12 |
| E | polyetherimide | 50–100 | <2 |
| F | polyamideimide | 5 | <2 |
| G | pre-oxidized acrylic | 15 | 10–12 |
| H | acrylic | 50 | 8 |

EXAMPLE 2

(Comparative)

The procedure of Example 1 is again followed except that 4 parts of fibrillated acrylic fiber A are added to 96 parts of Brake Mix A and mixed in the Waring Blender. The results are also set forth in Table 2, below.

EXAMPLES 3 & 4

The procedure of Example 1 is again followed except that 4 parts of a hybridized acrylic composite mixture, consisting of the ratios set forth below:

| MIXTURE | EXAMPLE 3 | EXAMPLE 4 |
|---|---|---|
| Fibrillated Fiber (A) | 80 | 70 |
| Staple (A) | 10 | 10 |
| Powder (A) | 10 | 20 | are added to 96 parts of Brake Mix A and mixed in the Waring Blender. The results are set forth in Table 2 below.

As can be readily appreciated, the preformed pads of Examples 3 and 4 produced according to this instant invention unexpectedly equal the standard (Comparative Example 2) in breaking load, stiffness and measured performance index (MPI) even though 20–30% of the blend is comprised of components not known to be preform aids. Without the use of a processing aid, as shown in comparative Example 1, preforms cannot be satisfactorily produced.

TABLE 2

| Property | Unit | No Fiber (Example 1) | Fibrillated Fiber (A) (Example 2) | 80/10/10 (Example 3) | 70/10/20 (Example 4) |
|---|---|---|---|---|---|
| Mix Bulkiness | — | Dense | O.K. | O.K. | O.K. |
| Preform Strength | lbs | .81 | 2.79 | 2.83 | 2.76 |
| Preform Stiffness | lbs/in. | 23 | 67.6 | 68.4 | 67.0 |
| Thickness | in. | 0.915 | 0.927 | 0.939 | 0.929 |
| Recovery | % | 4.7 | 4.1 | 4.5 | 4.4 |
| Appearance | — | Low Integrity Crumbles on Handling | High integrity preform, No cracking or | High integrity preform, No cracking or | High integrity preform, No cracking or |

TABLE 2-continued

| Property | Unit | No Fiber (Example 1) | Fibrillated Fiber (A) (Example 2) | 80/10/10 (Example 3) | 70/10/20 (Example 4) |
|---|---|---|---|---|---|
| Predicted Performance Index | — | — | — | Crumbling, Good uniformity 11.0 | Crumbling, Good uniformity 9.6 |
| Measured Performance Index | — | 4.3 | 13.6 | 13.9 | 13.5 |

EXAMPLE 5

(Comparative)

The procedure of Example 2 is again followed except that 4 parts of fibrillated acrylic fiber A are added to 96 parts of Brake Mix A for testing on the same day as Examples 6–8. The results are set forth in Table 3.

EXAMPLES 6–8

The procedure of Example 2 is again followed except that 4 parts of a hybridized acrylic composite mixture, consisting; of the ratios set forth below:

| MIXTURE | EXAMPLE 6 | EXAMPLE 7 | EXAMPLE 8 |
|---|---|---|---|
| Fibrillated Fiber (A) | 70 | 70 | 70 |
| Staple (A) | 15 | 0 | 30 |
| Powder (A) | 15 | 30 | 0 | are added to 96 parts of Brake Mix A and mixed in the Waring Blender. The results are set forth in Table 3.

Again, only hybridized composite mixtures comprised of a blend of fibrillated fiber, unfibrillated fiber and organic powder has the unexpected and surprising effect of serving as an effective preforming and processing aid. The use of powder alone with fibrillated fiber results in unacceptable preform strength and the use of staple alone with fibrillated fiber results in unacceptable softness.

of Brake Mix A and mixed in the Waring Blender. Results are set forth in Table 4, below.

EXAMPLES 10–16

The procedure of Example 2 is again followed except that 6 parts of a hybridized acrylic composite mixture consisting of the ratios set forth below are added to 94 parts Brake Mix A and mixed in the Waring Blender. Staple fiber O is a short, small diameter acrylic staple. Staple fibers P and Q are staples A and G, respectively, that have been passed through a mill to work and shorten them. Results are set forth in Table 4.

TABLE 3

| | | Comparison of Preform Properties | | | |
|---|---|---|---|---|---|
| Property | Unit | Fibrillated Fiber (A) Example 5 (Comparative) | 70/15/15 Example 6 | 70/0/30 Example 7 (Comparative) | 70/30/0 Example 8 (Comparative) |
| Mix Bulkiness | — | O.K. | O.K. | O.K. | excessive |
| Preform Strength | lbs | 3.13 | 2.87 | 2.02 | 2.66 |
| Preform Stiffness | lbs/in. | 85 | 70 | 58 | 49 |
| Thickness | in. | 0.946 | 0.966 | 0.948 | 1.009 |
| Recovery | % | 4.2 | 5.3 | 4.3 | 6.0 |
| Appearance | — | | High integrity preform, No cracking or Crumbling, Good uniformity | | Too Thick & Springy |
| Predicted Performance Index | — | — | 11.4 | 11.4 | 11.4 |
| Measured Performance Index | | 16.3 | 14.2 | 10.8 | 11.4 |

EXAMPLE 9

The procedure of Example 2 is again followed except that 3 parts of fibrillated acrylic fiber (A) are added to 97 parts

| MIXTURE | EXAMPLE 10 | EXAMPLE 11 | EXAMPLE 12 | EXAMPLE 13 | EXAMPLE 14 | EXAMPLE 15 | EXAMPLE 16 |
|---|---|---|---|---|---|---|---|
| Fibrillated Fiber (A) | 50 | 50 | 50 | 50 | 50 | 50 | 50 |
| Staple Fiber (O) | — | 50 | — | — | 25 | — | — |
| Staple Fiber (P) | — | — | 50 | — | — | 25 | — |
| Staple FIBER (Q) | — | — | — | 50 | — | — | 25 |
| Powder (H) | 50 | — | — | — | 25 | 25 | 25 |

These results indicate that while some marginal preforming benefits can be obtained by combinations of either fibrillated fiber and staple, or fibrillated fiber and powder, all three components in combination unexpectedly provide the maximum performance. For these short staples, effectiveness is shown at a staple level of 25% of the hybridized composite mixture.

These results indicate that, for staples of this length, staple levels of 5–20% of the total hybridized composite mixture are preferred to blends containing no staple or blends containing in excess of 20 percent staple.

TABLE 4

| PROPERTY | UNIT | 50/0/0 Example 9 (Comparative) | 50/0/50 Example 10 (Comparative) | 50/50/0 Example 11 (Comparative) | 50/50/0 Example 12 (Comparative) | 50/50/0 Example 13 (Comparative) | 50/25/25 Example 14 | 50/25/25 Example 15 | 50/25/25 Example 16 |
|---|---|---|---|---|---|---|---|---|---|
| Mix Bulkiness | | O.K. | O.K. | O.K. | O.K. | O.K. | O.K. | O.K. | O.K. |
| Preform Strength | LBS | 1.61 | 1.77 | 2.16 | 2.73 | 2.40 | 2.57 | 2.28 | 2.61 |
| Preform Stiffness | LB/IN | 39 | 42 | 39 | 35 | 42 | 47 | 53 | 54 |
| Appearance | | High Integrity Preform, No Cracking or Crumbling, Good Uniformity | | | High Integrity, But Springy. Marginal Uniformity | | High Integrity Preform, No Cracking or Crumbling. Good Uniformity | | |
| Predicted Performance Factor | | 7.9 | 7.9 | 7.9 | 7.9 | 7.9 | 7.9 | 7.9 | 7.9 |
| Measured Performance Index | | 7.9 | 8.6 | 9.2 | 9.7 | 10.0 | 11.0 | 13.2 | 11.9 |

EXAMPLES 17–23

The procedure of Example 2 is again followed except that 6 parts of a hybridized acrylic composite mixture, consisting of the ratios set forth below:

| MIXTURE | EXAMPLE 17 (Comparative) | EXAMPLE 18 (Comparative) | EXAMPLE 19 | EXAMPLE 20 | EXAMPLE 21 | EXAMPLE 22 | EXAMPLE 23 (Comparative) |
|---|---|---|---|---|---|---|---|
| Fibrillated Fiber (A) | 50 | 50 | 50 | 50 | 50 | 50 | 50 |
| Staple (A) | 0 | 0 | 5 | 10 | 15 | 20 | 25 |
| Powder (A) | 0 | 50 | 45 | 40 | 35 | 30 | 25 | are added to 94 parts of Brake Mix A and mixed in the Waring Blender. The results are set forth in Table 5 below.

TABLE 5

Comparison of Preform Properties

| | 50/0/0 Example 17 | 50/0/50 Example 18 | 50/5/45 | 50/10/40 | 50/15/35 | 50/20/30 | 50/25/25 Example 23 |
|---|---|---|---|---|---|---|---|

| Property | Unit | (Comparative) | (Comparative) | Example 19 | Example 20 | Example 21 | Example 22 | (Comparative) |
|---|---|---|---|---|---|---|---|---|
| Mix Bulkiness | | O.K. | O.K. | O.K. | O.K. | O.K. | excessive | excessive |
| Preform Strength | lbs | 2.29 | 2.42 | 2.88 | 3.29 | 3.28 | 2.94 | 2.96 |
| Preform Stiffness | lbs/in. | 64 | 71 | 80 | 79 | 65 | 63 | 50 |
| Thickness | in. | — | 0.956 | 0.966 | 0.980 | 1.001 | 1.013 | 1.034 |
| Recovery | % | — | 4.4 | 4.8 | 5.3 | 5.9 | 6.0 | 6.6 |
| Appearance | — | — | High Integrity Preforms Good Uniformity No Cracking or Crumbling | | | | Slightly Ragged Edges | Too Thick & Non-Uniform |
| Predicted Performance Index | — | 12.1 | 12.1 | 12.1 | 12.1 | 12.1 | 12.1 | 12.1 |
| Measured Performance Index | — | 12.1 | 13.1 | 15.2 | 16.1 | 14.6 | 13.6 | 12.1 |

EXAMPLE 24

(Comparative)

The procedure of Example 2 is again followed except that 2.8 parts of fibrillated acrylic fiber (A) are added to 97.2 parts of Brake Mix A and mixed in the Waring Blender. Results are set forth in Table 5.

EXAMPLES 25–31

The procedure of Example 2 is again followed except that 4 parts of a hybridized acrylic composite mixture consisting of the ratios set forth below:

EXAMPLES 32–34

The procedure of Example 2 is again followed except that 6 parts of a hybridized composite acrylic mixture, consisting of the ratios set forth below:

| MIXTURE | EXAMPLE 32 | EXAMPLE 33 | EXAMPLE 34 |
|---|---|---|---|
| Fibrillated Fiber (A) | 45 | 45 | 45 |
| Staple (A) | 10 | 10 | 10 |

| MIXTURE | EXAMPLE 25 | EXAMPLE 26 | EXAMPLE 27 | EXAMPLE 28 | EXAMPLE 29 | EXAMPLE 30 | EXAMPLE 31 |
|---|---|---|---|---|---|---|---|
| Fibrillated Fiber (A) | 70 | 70 | 70 | 70 | 70 | 70 | 70 |
| Staple Fiber (A) | 10 | — | — | — | — | — | — |
| Staple Fiber (B) | — | 10 | — | — | — | — | — |
| Staple Fiber (C) | — | — | 10 | — | — | — | — |
| Staple Fiber (D) | — | — | — | 10 | — | — | — |
| Staple Fiber (F) | — | — | — | — | 10 | — | — |
| Staple Fiber (F) | — | — | — | — | — | 10 | — |
| Staple Fiber (G) | — | — | — | — | — | — | 10 |
| Powder (A) | 20 | 20 | 20 | 20 | 20 | 20 | 20 | are added to 96 parts of Brake Mix A and mixed in the Waring Blender. Staple fibers A–G vary in denier, length, and crimp. Results are set forth in Table 6.

TABLE 6

| Property | Unit | 70/0/0 Example 24 (Comparative) | 70/10/20 Example 25 | 70/10/20 Example 26 | 70/10/20 Example 27 | 70/10/20 Example 28 | 70/10/20 Example 29 | 70/10/20 Example 30 | 70/10/20 Example 31 |
|---|---|---|---|---|---|---|---|---|---|
| Mix Bulkiness | | O.K. | O.K. | O.K. | O.K. | O.K. | O.K | O.K. | O.K. |
| Preform Strength | lbs | 2.30 | 2.59 | 2.44 | 2.87 | 2.64 | 2.19 | 2.21 | 2.19 |
| Preform Stiffness | lbs/in. | 56 | 60 | 64 | 69 | 67 | 55 | 61 | 60 |
| Thickness | in. | | .960 | .953 | .952 | .953 | .955 | .956 | .954 |
| Recovery | % | | 4.9 | 4.7 | 4.5 | 4.5 | 4.6 | 4.6 | 4.6 |
| Appearance | — | | High Integrity Preforms No Cracking or Crumbling Good Uniformity | | | | | | |
| Predicted Performance Index | — | — | 11.3 | 11.3 | 11.3 | 11.3 | 11.3 | 11.3 | 11.3 |
| Measured Performance Index | — | 11.3 | 12.5 | 12.5 | 14.1 | 13.3 | 11.0 | 11.6 | 11.5 |

| MIXTURE | EXAMPLE 32 | EXAMPLE 33 | EXAMPLE 34 |
|---|---|---|---|
| Powder (A) | 45 | — | — |
| Powder (B) | — | 45 | — |
| Powder (C) | — | — | 45 | are added to 94 parts of Brake Mix A and mixed in the Waring blender. Powder (A) has a mean diameter of 50 microns and a surface area of 8.7 m²/g. Powder (B) has a mean diameter of 20 microns and a surface area of 12.4 m²/g. Powder (C) has a diameter of 30 microns and a surface area of 9.5 m²/g. The results are set forth in Table 7.

TABLE 7

Comparison of Preform Properties

| Property | Unit | 45/10/45 Example 32 | 45/10/45 Example 33 | 45/10/45 Example 34 |
|---|---|---|---|---|
| Mix Bulkiness | | O.K. | O.K. | O.K. |
| Preform Strength | lbs | 3.24 ± .37 | 3.73 ± .27 | 3.20 ± .17 |
| Preform Stiffness | lbs/in. | 85 ± 4 | 108 | 90 |
| Measured Performance Index | — | 16.6 | 20.1 | 17.0 |
| Thickness | in. | .965 ± .003 | .960 ± .003 | .967 ± .004 |
| Recovery | % | 7.7 ± .1 | 7.7 ± .3 | 7.7 ± .3 |
| Appearance | — | High Integrity Preforms No Cracking or Crumbling Good Uniformity | | |

EXAMPLE 35

The procedure of Example 2 is again followed except that 4 parts of fibrillated fiber (A) are added to 96 parts of Brake Mix A and mixed in the Waring Blender for testing on the same day as Examples 28–30. Results are set forth in Table 8.

EXAMPLES 36–38

The procedure of Example 2 is again followed except that 4 parts of a hybridized acrylic composite mixture, consisting of the ratios set forth below:

| MIXTURE | EXAMPLE 36 | EXAMPLE 37 | EXAMPLE 38 |
|---|---|---|---|
| Fibrillated Fiber (A) | 60 | — | — |
| Fibrillated Fiber (B) | — | 60 | — |
| Fibrillated Fiber (C) | — | — | 60 |
| Staple (A) | 7 | 7 | 7 |
| Powder (B) | 33 | 33 | 33 | are added to 96 parts of Brake Mix A and mixed in the Waring Blender. Fibrillated fibers (A, B, C) have a Canadian Standard Freeness (CSF) of 250, 180 and 430 ml, respectively. The results are set forth in Table 8. All preforms are of an acceptable quality.

TABLE 8

Comparison of Preform Properties

| Property | Unit | Fibrillated Fiber (A) Example 35 (Comparative) | 60/7/33 Example 36 | 60/7/33 Example 37 | 60/7/33 Example 38 |
|---|---|---|---|---|---|
| Mix Bulkiness | | O.K. | O.K. | O.K. | O.K. |
| Preform Strength | lbs | 2.96 ± .28 | 2.46 ± .06 | 2.48 ± .32 | 2.28 ± .19 |
| Preform Stiffness | lbs/in. | 90 ± 9 | 82 ± 4 | 75 ± 8 | 73 ± 6 |
| Thickness | in. | | .937 | .940 | .936 |
| Recovery | % | | 4.8 | 4.8 | 4.7 |
| Appearance | — | | High Integrity Preforms No Cracking or Crumbling Good Uniformity | | |
| Predicted Performance Index | | — | 9.8 | 9.8 | 9.8 |
| Measured Performance Index | | 16.3 | 14.2 | 13.6 | 12.9 |

EXAMPLE 39

The procedure of Example 2 is again followed except that 3 parts of fibrillated fiber (A) are added to 97 parts of Brake Mix A and mixed in the Waring Blender for testing on the same day as Examples 32–35 and Examples 36–39. Results are set forth in Table 9.

EXAMPLES 40–43

The procedure of Example 2 is again followed except that 6 parts of a blended acrylic composite mixture, consisting of the ratios set forth below:

| MIXTURE | EXAMPLE 40 | EXAMPLE 41 | EXAMPLE 42 | EXAMPLE 43 |
|---|---|---|---|---|
| Fibrillated Fiber (A) | 50 | 50 | 50 | 50 |
| Staple (A) | 7 | — | — | — |
| Staple (H) | — | 7 | — | — |
| Staple (I) | — | — | 7 | — |
| Staple (J) | — | — | — | 7 |
| Powder (B) | 43 | 43 | 43 | 43 | are added to 94 parts of Brake Mix A and mixed in the Waring Blender. Staple (H) is a high molecular weight acrylic produced following the teachings of U.S. Pat. No. 4,535,027. Staple (I) is a partially preoxidized acrylic fiber. Staple (J) is a commercially available preoxidized staple. Staples H, I, J are recognized by those versed in the art as having improved thermal stability and higher modulus compared to Staple A. The results are set forth in Table 9. The preformability of hybridized acrylic composite mixtures where the staple component used has improved thermal stability and higher modulus is excellent.

TABLE 9

| | | Comparison of Preform Properties | | | | |
|---|---|---|---|---|---|---|
| Property | Unit | Example 39 (Comparative) | 50/7/43 Example 40 | 50/7/43 Example 41 | 50/7/43 Example 42 | 50/7/43 Example 43 |
| Mix Bulkiness | — | O.K. | O.K. | O.K. | O.K. | O.K. |
| Preform Strength | lbs | 2.32 ± .17 | 3.62 ± .35 | 3.86 ± .48 | 3.44 ± .22 | 3.07 ± .23 |
| Preform Stiffness | lbs/in. | 67 ± 7 | 89 ± 6 | 103 ± 7 | 89 ± 5 | 81 ± 8 |
| Thickness | in. | .926 ± .005 | .954 | .957 | .953 | .954 |
| Recovery | % | 6.5 | 6.6 | 6.5 | 6.4 | |
| Appearance | — | | High Integrity Preforms No Cracking or Crumbling Good Uniformity | | | |
| Predicted Performance Index | — | 12.5 | 12.5 | 12.5 | 12.5 | 12.5 |
| Measured Performance Index | — | 12.5 | 17.9 | 19.9 | 17.5 | 15.8 |

EXAMPLES 44–47

The procedure of Examples 40–43 is again followed except that Powder (B) is partially preoxidized by heating in air at 210° C. for two hours. The resulting powder, identified as Powder (D) is straw brown in color, indicating an increase in thermal stability. Powder (D) is substituted for Powder (B) in the hybridized composite mixture and examples 40–43 are repeated. Results are set forth in Table 10. The preformability of hybridized acrylic composite mixtures where the acrylic powder has improved thermal stability is excellent.

TABLE 10

| | | Comparison of Preform Properties | | | | |
|---|---|---|---|---|---|---|
| Property | Unit | Example 39 (Comparative) | 50/7/43 Example 44 | 50/7/43 Example 45 | 50/7/43 Example 46 | 50/7/43 Example 47 |
| Mix Bulkiness | — | O.K. | O.K. | O.K. | O.K. | O.K. |
| Preform Strength | lbs | 2.32 ± .17 | 2.92 ± .27 | 3.48 ± .19 | 3.10 ± .51 | 2.78 ± .05 |
| Preform Stiffness | lbs/in. | 67 | 83 ± 3 | 90 ± 10 | 85 ± 5 | 75 ± 5 |
| Thickness | in. | .926 | .967 | .963 | .965 | .967 |
| Recovery | % | — | 6.9 | 6.7 | 6.7 | 6.6 |
| Appearance | — | | High Integrity Preforms No Cracking or Crumbling Good Uniformity | | | |
| Predicted Performance Index | — | — | 12.5 | 12.5 | 12.5 | 12.5 |
| Measured Performance Index | — | 12.5 | 15.6 | 17.7 | 16.2 | 14.4 |

EXAMPLE 48

The procedure of Example 2 is again followed except that 4 parts of fibrillated fiber (A) are added to 96 parts of Brake Mix A for testing on the same day as Examples 49–50. Results are set forth in Table 11.

EXAMPLES 49–50

The procedure of Example 2 is again followed except that 4 parts of an acrylic containing hybridized composite mixture, consisting of the ratios set forth below:

| MIXTURE | EXAMPLE 49 | EXAMPLE 50 |
|---|---|---|
| Fibrillated Fiber (A) | 60 | 60 |
| Staple (A) | 7 | 7 |
| Powder (E) | 33 | — |
| Powder (F) | — | 33 | are added to 96 parts of Brake Mix A. The organic powders in this example are non-acrylic. Specifically Powder (E) is a polyetherimide with a mean diameter of 50 microns and Powder (F) is a polyamideimide with a mean diameter of 5 microns. Results are set forth in Table 11.

TABLE 11

| | | Comparison of Preform Properties | | |
|---|---|---|---|---|
| Property | Unit | Fibrillated Fiber (A) Example 48 (Comparative) | 60/7/33 Example 49 | 60/7/33 Example 50 |
| Mix Bulkiness | — | O.K. | O.K. | O.K. |
| Preform Strength | lbs | 2.95 ± .28 | 2.29 ± .2 | 2.17 ± .36 |
| Preform Stiffness | lbs/in. | 90 ± 9 | 76 ± 5 | 70 ± 2 |

TABLE 11-continued

Comparison of Preform Properties

| Property | Unit | Fibrillated Fiber (A) Example 48 (Comparative) | 60/7/33 Example 49 | 60/7/33 Example 50 |
|---|---|---|---|---|
| Thickness | in. | .926 | .939 | .940 |
| Recovery | % | — | 4.6 | 4.8 |
| Appearance | — | | High Integrity Preforms No Cracking or Crumbling Good Uniformity | |
| Predicted Performance Index | — | — | 9.8 | 9.8 |
| Measured Performance Index | — | 16.3 | 13.2 | 12.3 |

EXAMPLE 51

A non-asbestos organic friction (NAO) formulation, designated Brake Mix B, is prepared using the components set forth in Table 12. The formulation is mixed in a Littleford Model FM-130-D Mixer. Ninety-seven parts of Brake Mix B are mixed with 3 parts of fibrillated fiber (A). All components, except fiberglass, are premixed for ten minutes. The fiberglass is then added, and the formulation is mixed for another one minute. Star/bar choppers and Becker plows are used in the Littleford Mixer. Bulk density of the mix is measured at the end of the mixing cycle. Preforms are prepared and tested using the procedures described in Example 1. Results are set forth in. Table 13.

| MIXTURE | EXAMPLE 53 | EXAMPLE 54 |
|---|---|---|
| Fibrillated Fiber (A) | 70 | 45 |
| Staple (A) | 10 | 10 |
| Powder (A) | 20 | 45 | are added to 97 parts of Brake Mix B. The results are set forth in Table 13. The use of hybridized acrylic composite mixtures again provide excellent control of bulk density and good preform properties. The unexpected beneficial synergies of the blends are clearly shown.

TABLE 12

| INGREDIENT | PARTS BY WEIGHT |
|---|---|
| PHENOLIC POWDER HRJ 652 | 15.6 |
| HYCAR 1411 RUBBER | 1.0 |
| FIBERGLASS, ⅛" 178A-BA | 7.2 |
| 5559 GRAPHITE | 9.8 |
| 4079 COKE | 7.2 |
| NC108 CASHEW PARTICLE | 4.1 |
| CCG 330 RECYCLED RUBBER | 6.1 |
| MARBLE WHITE | 5.7 |
| BARYTES 22 | 30.9 |
| VIRGINIA KYANITE | 2.1 |
| VERMICULITE #7 | 10.3 |
| TOTAL: | 100.0 |

TABLE 13

Comparison of Preform Properties

| Property | Unit | Fibrillated Fiber (A) Example 51 (Comparative) | Fibrillated Fiber (D) Example 52 (Comparative) | 70/10/20 Example 53 | 45/10/45 Example 54 |
|---|---|---|---|---|---|
| Mix Bulk Density | lbs/ft$^3$ | 26.9 | 34.1 | 27.1 | 31.2 |
| Preform Strength | lbs | 1.91 ± .09 | 0.90 ± .06 | 1.76 ± .16 | 1.69 ± .17 |
| Preform Stiffness | lbs/in. | 40 ± 3 | 18 ± 2 | 37 ± 2 | 36 ± 2 |
| Thickness | in. | .995 ± .003 | 1.010 ± .006 | .992 ± .003 | .987 ± .002 |
| Recovery | % | 5.2 ± .2 | 6.3 ± .2 | 5.4 ± .2 | 5.2 ± .2 |
| Appearance | — | High integrity preform, No cracking or Crumbling, Good uniformity | Weak Preforms | Same as Example 51 | |
| Predicted Performance Index | — | 8.7 | 4.0 | 7.0 | 3.9 |
| Measured Performance Index | — | 8.7 | 4.0 | 8.1 | 7.8 |

EXAMPLE 52

(Comparative)

The procedure of Example 51 is again followed except that 3 parts of a commercially available fibrillated acrylic fiber (D), are added to 97 parts of Brake Mix B. The results are set forth in Table 13.

EXAMPLES 53–54

The procedure of Example 51 is again followed except that 3 parts of a hybridized acrylic composite mixture, consisting of the ratios set forth below:

EXAMPLE 55

(Comparative)

Thirty pounds of a non-asbestos organic (NAO) friction formulation are prepared using the components set forth in Table 14. The formulation is mixed in a Littleford Model FM-130-D Mixer. All components except fiberglass are premixed for ten minutes. The fiberglass is then added and the formulation is mixed for another one minute. Star/bar choppers and Becker plows are used in the Littleford Mixer. The resultant product is identified as Brake Mix C.

TABLE 14

| INGREDIENT | PARTS BY WEIGHT |
| --- | --- |
| HRJ 652 PHENOLIC | 17.0 |
| HYCAR 1411 | 1.0 |
| CORNING 178A-BA ⅛" FIBERGLASS | 8.0 |
| 5551 GRAPHITE | 9.5 |
| 4079 COKE | 7.0 |
| NC 108 CASHEW PARTICLE | 4.0 |
| CCG 330 GROUND RUBBER | 6.0 |
| MARBLE WHITE | 5.5 |
| BARYTES 22 | 30.0 |
| VIRGINIA KYANITE | 2.0 |
| VERMICULITE #7 | 10.0 |
| TOTAL: | 100.0 |

EXAMPLE 56

(Comparative)

Ten parts of fibrillated acrylic fiber (A) are added to 90 parts of Brake Mix C and mixed in the Waring blender for one minute. A 220 gram sample of mix is evenly spread in a 5 inch by 5 inch compression mold which is at room temperature. The mold is inserted into a preheated press at 330° F. and compressed to 2500 psi and cured under pressure for 30 minutes. The molded panel, which has a thickness of approximately 0.28 inches, is then post-cured at 350° F. for 12 hours under 100 psi pressure in the press. Test specimens are machined from the panels and the flexural properties and fracture toughness properties are determined in accordance with ASTM D-790 and ASTM E-399, respectively. The results are set forth in Table 15, below:

EXAMPLES 57–60

The procedure of Example 56 is again followed except that 10 parts of a hybridized acrylic composite mixture, consisting of the ratios set forth below:

| MIXTURE | EXAMPLE 57 | EXAMPLE 58 | EXAMPLE 59 | EXAMPLE 60 |
| --- | --- | --- | --- | --- |
| Fibrillated Fiber (A) | 50 | 50 | 50 | 50 |
| Staple (A) | 20 | — | — | — |
| Staple (H) | — | 20 | — | — |
| Staple (I) | — | — | 20 | — |
| Staple (J) | — | — | — | 20 |
| Powder (B) | 30 | 30 | 30 | 30 | are added to 10 parts of Brake Mix C and mixed in the Waring blender. The results are set forth in Table 15 below.

A significant improvement in flexural strength occurs when the blend containing the Staple (H) or (I) is used. In all cases, improvement in toughness is seen with the use of the hybridized acrylic composite mixtures compared to fibrillated acrylic fiber alone.

EXAMPLES 61–62

The procedure of Example 56 is again followed except that 10 parts of an acrylic containing hybridized composite mixture, consisting of the ratios set forth below:

| MIXTURE | EXAMPLE 61 | EXAMPLE 62 |
| --- | --- | --- |
| Fibrillated Fiber (E) | 50 | 50 |
| Staple (H) | 20 | — |
| Staple (K) | — | 20 |
| Powder (H) | 30 | 30 | are added to 10 parts of Brake Mix C and mixed in the Waring blender. The results are set forth in Table 15 below.

TABLE 15

| Property | Units | Fibrillated Fiber (A) Example 56 (Comparative) | 50/20/30 Example 57 | 50/20/30 Example 58 | 50/20/30 Example 59 | 50/20/30 Example 60 | 50/20/30 Example 61 | 50/20/30 Example 62 |
| --- | --- | --- | --- | --- | --- | --- | --- | --- |
| Flexural Strength | KSI | 5.48 | 5.51 | 6.75 | 6.04 | 5.41 | 6.25 | 5.56 |
| Flexural Modulus | MSI | 1.39 | 1.38 | 1.42 | 1.35 | 1.39 | 1.37 | 1.30 |
| Flexural Strain | % | 0.39 | 0.40 | 0.48 | 0.45 | 0.39 | .46 | .43 |
| Stress Intensity Factor ($K_{IC}$) | PSI-IN$^{1/2}$ | 1698 ± 98 | 1926 ± 152 | 2336 ± 242 | 2202 ± 174 | 1871 ± 132 | 2326 ± 237 | 2416 ± 326 |
| Fracture Toughness ($G_{OC}$) | IN-LB/IN$^2$ | 2.07 | 2.69 | 3.84 | 3.59 | 2.51 | 3.95 | 4.49 |

EXAMPLE 63

(Comparative)

Ten parts of fibrillated fiber (A) are added to 90 parts of Brake Mix C and mixed in the Waring blender for one minute. A 60 gram sample of mix is evenly spread in a 2½ by 2½ inch compression mold and molded using the procedure given in Example 56. After molding, the surface is ground and the plaque cut into one-inch squares. The test specimens are tested in accordance with SAE-J-661-a, "Brake Lining Quality Control Test Procedure" (Chase Test for Friction and Wear). Results are set forth in Table 16 below.

EXAMPLES 64–68

The procedures of Example 63 is again followed except that 10 parts of a hybridized acrylic composite mixture, consisting of the ratios set forth below:

| MIXTURE | Example 64 | Example 65 | Example 66 | Example 67 | Example 68 |
| --- | --- | --- | --- | --- | --- |
| Fibrillated Fiber (A) | 30 | 30 | 30 | 30 | 30 |
| Staple (A) | 20 | — | — | — | — |
| Staple (I) | — | 20 | — | 20 | — |
| Staple (J) | — | — | 20 | — | 20 |
| Powder (B) | 50 | — | — | — | — |
| Powder | — | 50 | 50 | — | — |

| MIXTURE | Example 64 | Example 65 | Example 66 | Example 67 | Example 68 |
|---|---|---|---|---|---|
| (D) | | | | | |
| Powder (G) | — | — | — | 50 | 50 | are added to 96 parts of Brake Mix C and mixed in the Waring blender. Powder (G) is prepared by preoxidizing Powder (B) by heating in air at 210° C. for 16 hours followed by 4 hours in air at 240° C. The resulting powder is black in color. The results are set forth in Table 16. The formulations containing hybridized composite mixtures are higher in brake effectiveness and coefficient of friction compared to Example 63.

TABLE 16

COMPARISON OF FRICTIONAL PROPERTIES

| Property | Unit | Fibrillated Fiber (A) Example 63 (Comparative) | 50/20/30 Example 64 | 50/20/30 Example 65 | 50/20/30 Example 66 | 50/20/30 Example 67 | 50/20/30 Example 68 |
|---|---|---|---|---|---|---|---|
| Normal Friction | μ | .270 | .315 | .298 | .300 | .300 | .368 |
| Hot Friction | μ | .296 | .306 | .356 | .302 | .294 | .347 |

EXAMPLE 69

(Comparative)

The procedure of Example 2 is again followed except that 4 parts of fibrillated aramid fiber E are added to 96 parts of Brake Mix A. The results are set forth in Table 17 below.

EXAMPLES 70–71

The procedure of Example 2 is again followed except that 4 parts of an acrylic containing hybridized composite mixture, consisting of the ratios set forth below:

| MIXTURE | EXAMPLE 70 | EXAMPLE 71 |
|---|---|---|
| Fibrillated Fiber (E) | 70 | 70 |
| Staple (A) | 10 | 0 |
| Staple (K) | 0 | 10 |
| Powder (B) | 20 | 20 | are added to 96 parts of Brake Mix A and mixed in the Waring Blender. The results are set forth in Table 17.

The use of either an acrylic staple (A) or aramid staple (K) as the staple portion of the 70/10/20 hybridized composite mixture provides the stone unexpected performance similar to that seen when all acrylic components are used. The hybridized composite containing acrylic staple provides 93 percent of the preform properties of aramid pulp; the composite containing aramid staple provides 100% of the preform properties of aramid pulp.

TABLE 17

Comparison of Preform Properties

| Property | Unit | Fibrillated Fiber (E) Example 69 (Comparative) | 70/10/20 Example 70 | 70/10/20 Example 71 |
|---|---|---|---|---|
| Mix Bulkiness | — | O.K. | O.K. | O.K. |
| Preform Strength | lbs | 3.70 ± .38 | 3.44 ± .36 | 3.59 ± .58 |
| Preform Stiffness | lbs/in. | 88 ± 5 | 81 ± 8 | 89 ± 5 |
| Thickness | in. | 0.901 | 0.909 | 0.902 |
| Recovery | % | 5.2 | 5.5 | 5.1 |
| Appearance | — | High integrity preform, No cracking or Crumbling, Good uniformity | | |
| Predicted Performance Index | — | — | 12.6 | 12.6 |
| Measured Performance Index | — | 18.0 | 16.7 | 17.9 |

EXAMPLE 72

(Comparative)

The procedure of Example 2 is again followed except that 4 parts of fibrillated acrylic fiber A are added to 96 parts of Brake Mix A for testing on the same day as Examples 73–76. The results are set forth in Table 18.

EXAMPLES 73–76

The procedure of Example 2 is again followed except that 4 parts of an acrylic containing hybridized composite mixture, consisting of the ratios set forth below:

| MIXTURE | EXAMPLE 73 | EXAMPLE 74 | EXAMPLE 75 | EXAMPLE 76 |
|---|---|---|---|---|
| Fibrillated Fiber (A) | 70 | 70 | 70 | 70 |
| Staple (K) | 10 | — | — | — |
| Staple (L) | — | 10 | — | — |
| Staple (M) | — | — | 10 | — |
| Staple (N) | — | — | — | 10 |
| Powder (B) | 20 | 20 | 20 | 20 | are added to 96 parts of Brake Mix A and mixed in the Waring Blender. The results are set forth in Table 18 below:

TABLE 18

Comparison of Preform Properties

| Property | Unit | Fibrillated Fiber (A) Example 72 (Comparative) | 70/10/20 Example 73 | 70/10/20 Example 74 | 70/10/20 Example 75 | 70/10/20 Example 76 |
|---|---|---|---|---|---|---|
| Mix Bulkiness | | O.K. | O.K. | O.K. | O.K. | O.K. |
| Preform Strength | lbs | 3.19 ± .15 | 3.23 ± .21 | 2.22 ± .21 | 2.25 ± .24 | 2.26 ± .21 |
| Preform Stiffness | lbs/in. | 77 ± 5 | 83 ± 6 | 53 ± 5 | 62 ± 2 | 61 ± 6 |
| Thickness | in. | .919 | .925 | .943 | .923 | .922 |
| Recovery | % | — | — | — | — | — |
| Appearance | — | | High Integrity Preforms No Cracking or Crumbling Good Uniformity | | | |
| Predicted Performance Index | — | 11.0 | 11.0 | 11.0 | 11.0 | 11.0 |
| Measured Performance Index | — | 15.7 | 16.3 | 10.8 | 11.8 | 11.7 |

EXAMPLE 77

(Comparative)

The procedure of Example 2 is again followed except that 4 parts of fibrillated acrylic fiber (D) are added to 96 parts of Brake Mix A and mixed in the Waring blender. Results are set forth in Table 19.

EXAMPLE 78

The procedure of Example 2 is again followed except that 4 parts of a hybridized composite acrylic mixture, consisting of the ratios set forth below:

| MIXTURE | EXAMPLE 78 |
|---|---|
| Fibrillated Fiber (D) | 70 |
| Staple (A) | 10 |
| Powder (B) | 20 | are added to 96 parts of Brake Mix A and mixed in the Waring blender. The results set forth in Table 19 show that preforming properties of the instant invention are actually improved relative to comparative Example 77.

TABLE 19

Comparison of Preform Properties

| Property | Unit | Fibrillated Fiber (D) Example 77 (Comparative) | 70/10/20 Example 78 |
|---|---|---|---|
| Mix Bulk Density | lbs/ft³ | O.K. | O.K. |
| Preform Strength | lbs | 1.95 ± .18 | 2.20 ± .31 |
| Preform Stiffness | lbs/in. | 49 ± 4 | 57 ± 4 |
| Thickness | in. | .942 | .949 |
| Recovery | % | | |
| Appearance | — | | High Integrity Preforms No Cracking or Crumbling Good Uniformity |
| Predicted Performance Index | — | — | 6.9 |
| Measured Performance Index | — | 9.8 | 11.2 |

EXAMPLES 78 and 79

The procedures of Examples 3 and 4, respectively, are followed except that the fibrillated fiber, the staple fiber and the powder are all produced from aramid polymer. Similar results are achieved.

EXAMPLES 80 and 81

The procedures of Examples 3 and 4, respectively, are again followed except that the powder is produced from aramid polymer. Similar results are obtained.

EXAMPLES 82 and 83

The procedures of Examples 3 and 4, respectively, are again followed except that both the staple fiber and powder are produced from aramid polymer. Similar results are achieved.

EXAMPLE 84

The procedure of Example 76 is again conducted except that Fibrillated Fiber (A) is replaced by Fibrillated Fiber (F). Again, an excellent preform is prepared.

EXAMPLE 85

The procedure of Example 77 is again followed except that Fibrillated Fiber (A) is replaced by Fibrillated Fiber (G). Excellent results are achieved.

We claim:

1. A method of making a non-asbestos friction material preform which comprises forming a mixture of a thermosetting binder and from about 1 to about 30 weight percent of a dry blend comprising:
   a) from about 25 to about 90 weight percent of a fibrillated, synthetic, organic polymer fiber,
   b) from about 5 to about 20 weight percent of a synthetic, organic polymer staple fiber and
   c) from about 5 to about 70 weight percent of soluble, synthetic, organic polymer particles and compressing said mixture to form a preform.

2. A method of making a friction element which comprises forming a mixture of a thermosetting binder and from about 1 to about 30 weight percent of a dry blend comprising:
   a) from about 25 to about 90 weight percent of a fibrillated, synthetic, organic polymer fiber,
   b) from about 5 to about 20 weight percent of a synthetic, organic polymer staple fiber and
   c) from about 5 to about 70 weight percent of soluble, synthetic, organic polymer particles, compressing said mixture to form a preform, curing said preform at an elevated temperature and forming a friction element from said cured preform.

3. A method according to claims 1 or 2 wherein at least one of a), b), and c) is an acrylic polymer.

4. A method according to claims 1 or 2 wherein each of a), b) and c) is an acrylic polymer.

5. A method according to claim 3 wherein said acrylic polymer is an acrylonitrile polymer.

6. A method according to claim 4 wherein said acrylic polymer is an acrylonitrile polymer.

7. A method according to claims 1 or 2 wherein the average diameter of c) is below about 60 microns.

8. A method according to claims 1 or 2 wherein the CSF of a) is below about 600 ml and the melting point of the polymer is above about 450° F.

9. A method according to claims 1 or 2 wherein c) has a BET surface area greater than 1 $m^2/g$.

10. A method according to claims 1 or 2 wherein b) has a length of from about 0.5 to 7 mm.

11. A method according to claims 1 or 2 wherein either or both of a) and/or b) are crimped.

12. A method according to claims 1 or 2 wherein either or both of b) and/or c) are pre-oxidized.

13. A method according to claims 1 or 2 wherein the concentration of a) is from about 35 to about 90 weight percent, the concentration of b) is from about 5 to about 15 weight percent and the concentration of c) is from about 5 to about 60 weight percent.

14. A method according to claims 1 or 2 wherein a) and/or b) is a bicomponent fiber.

15. A method according to claims 1 or 2 wherein at least one of a), b) and c) is an aramid polymer.

* * * * *